(12) United States Patent
Koch (10) Patent No.: US 12,085,773 B2
(45) Date of Patent: Sep. 10, 2024

(54) PLUG CONNECTOR PART FOR AN OPTICAL AND/OR ELECTRICAL PLUG CONNECTION

(71) Applicant: Neutrik AG, Schaan (LI)

(72) Inventor: Matthias Koch, Goetzis (AT)

(73) Assignee: Neutrik AG, Schaan (LI)

( * ) Notice: Subject to any disclaimer, the term of this patent is extended or adjusted under 35 U.S.C. 154(b) by 77 days.

(21) Appl. No.: 17/342,672

(22) Filed: Jun. 9, 2021

(65) Prior Publication Data

US 2022/0043230 A1 Feb. 10, 2022

(30) Foreign Application Priority Data

Aug. 7, 2020 (AT) .............................. A 50665/2020

(51) Int. Cl.
*G02B 6/44* (2006.01)
*H01R 13/512* (2006.01)
*H01R 13/58* (2006.01)

(52) U.S. Cl.
CPC ......... *G02B 6/4477* (2013.01); *H01R 13/512* (2013.01); *H01R 13/5825* (2013.01); *H01R 13/5845* (2013.01)

(58) Field of Classification Search
CPC .............. G02B 6/4477; H01R 13/512; H01R 13/5825; H01R 13/5845
See application file for complete search history.

(56) References Cited

U.S. PATENT DOCUMENTS

| 3,029,406 A | * | 4/1962 | Huth | H01R 13/625 439/736 |
| 4,647,127 A | * | 3/1987 | Weingartner | H01R 13/28 439/597 |
| 4,657,327 A | * | 4/1987 | Weingartner | H01R 13/28 439/597 |
| 4,730,890 A | * | 3/1988 | Kashimura | G02B 6/3888 385/87 |
| 4,795,229 A | * | 1/1989 | Abendschein | G02B 6/3888 385/87 |

(Continued)

FOREIGN PATENT DOCUMENTS

| CA | 2572567 A1 | * | 1/2006 |
| CN | 1985205 A | | 6/2007 |

(Continued)

OTHER PUBLICATIONS

Chinese Office Action dated Sep. 27, 2022 for Chinese Patent Application No. 202110893382.5.

*Primary Examiner* — Peter Radkowski
(74) *Attorney, Agent, or Firm* — Volpe Koenig (57) ABSTRACT

A plug connector part for an optical and/or electrical plug connection has at least a housing and at least a clamping sleeve, which are connected to each other by a releasable screw connection, wherein a strain relief arrangement for a cable guided into the plug connector part is arranged inside the housing and/or the clamping sleeve, which strain relief arrangement includes a strain relief sleeve, which is supported on an outer sleeve. The strain relief arrangement includes a sleeve opening toward the front in a funnel-shaped manner at least over a part of its length, through which litz wires, fibers or the like of the cable are guided and fixed therein.

15 Claims, 5 Drawing Sheets

(56) References Cited

U.S. PATENT DOCUMENTS

| | | | | |
|---|---|---|---|---|
| 4,802,728 A * | 2/1989 | Komatsu | | G02B 6/3855 |
| | | | | 385/86 |
| 5,142,601 A * | 8/1992 | Shibata | | G02B 6/3869 |
| | | | | 385/86 |
| 5,287,425 A * | 2/1994 | Chang | | G02B 6/3869 |
| | | | | 385/60 |
| 5,418,874 A * | 5/1995 | Carlisle | | G02B 6/3888 |
| | | | | 385/139 |
| 5,869,178 A * | 2/1999 | Kusy | | B29B 15/122 |
| | | | | 428/335 |
| 6,238,104 B1 * | 5/2001 | Yamakawa | | G02B 6/3888 |
| | | | | 385/86 |
| 6,537,247 B2 | 3/2003 | Shannon | | A61M 25/104 |
| | | | | 604/103.05 |
| 6,588,938 B1 | 7/2003 | Lampert et al. | | |
| 8,128,422 B2 * | 3/2012 | Mellott | | H01R 13/2421 |
| | | | | 439/180 |
| 8,241,053 B2 * | 8/2012 | Slippy | | H01R 24/86 |
| | | | | 439/353 |
| 9,297,964 B2 * | 3/2016 | Chang | | G02B 6/3857 |
| 9,494,745 B2 * | 11/2016 | Iizumi | | H01R 13/58 |
| 9,535,230 B2 * | 1/2017 | Newbury | | G02B 6/4471 |
| 9,671,567 B2 * | 6/2017 | Dobler | | H01R 43/16 |
| 9,958,617 B2 * | 5/2018 | Koch | | H01R 13/502 |
| 11,067,759 B2 * | 7/2021 | Newbury | | G02B 6/3825 |
| 2002/0183777 A1 * | 12/2002 | Shannon | | A61M 25/104 |
| | | | | 606/192 |
| 2005/0095899 A1 * | 5/2005 | Mellott | | H01R 13/6272 |
| | | | | 439/358 |
| 2009/0186503 A1 | 7/2009 | Dobler | | |
| 2011/0056723 A1 * | 3/2011 | Slippy | | H01R 24/86 |
| | | | | 174/73.1 |
| 2013/0072054 A1 | 3/2013 | Hotea et al. | | |
| 2015/0147033 A1 * | 5/2015 | Coggi | | G02B 6/3849 |
| | | | | 385/76 |
| 2015/0260936 A1 * | 9/2015 | Newbury | | G02B 6/3825 |
| | | | | 29/505 |
| 2015/0301294 A1 * | 10/2015 | Chang | | G02B 6/3887 |
| | | | | 385/87 |
| 2016/0085031 A1 * | 3/2016 | Dobler | | H01R 13/50 |
| | | | | 385/56 |
| 2016/0209601 A1 * | 7/2016 | Iizumi | | G02B 6/3888 |
| 2017/0212308 A1 * | 7/2017 | Koch | | H01R 13/622 |
| 2019/0339462 A1 * | 11/2019 | Koch | | G02B 6/3849 |
| 2020/0183098 A1 * | 6/2020 | Newbury | | G02B 6/4472 |

FOREIGN PATENT DOCUMENTS

| | | | | |
|---|---|---|---|---|
| CN | 107636505 | A | 1/2018 | |
| DE | 33 15 864 | A1 | 12/1983 | |
| DE | 3315863 | A * | 12/1983 | H01R 13/28 |
| DE | 35 24 105 | A1 | 1/1987 | |
| DE | 4431451 | A1 * | 3/1996 | H01R 13/504 |
| DE | 20 2004 016 541 | U1 | 1/2005 | |
| DE | 202017006800 | U1 | 6/2018 | |
| DE | 202018102532 | U1 * | 6/2018 | G02B 6/3849 |
| EP | 0008941 | A1 * | 3/1980 | G02B 6/3861 |
| EP | 1383209 | A1 * | 1/2004 | H01R 24/545 |
| EP | 1598684 | A2 * | 11/2005 | G02B 6/3887 |
| EP | 1598685 | A1 * | 11/2005 | G02B 6/3879 |
| EP | 1689057 | A1 * | 8/2006 | H01R 13/562 |
| EP | 1 650 833 | B1 | 12/2008 | |
| EP | 3196684 | A1 * | 7/2017 | G02B 6/3817 |
| GB | 2 177 268 | B | 11/1988 | |
| JP | H11174276 | A * | 10/1997 | |
| JP | 11231171 | A * | 8/1999 | G02B 6/3869 |
| JP | 2001147343 | A * | 5/2001 | |
| JP | 2001272585 | A * | 10/2001 | |
| JP | 2004151127 | A * | 5/2004 | |
| JP | 2013504857 | A | 2/2013 | |
| JP | 2017135108 | A | 8/2017 | |
| JP | 2019504363 | A | 2/2019 | |
| WO | 2011/116194 | A2 | 9/2011 | |

* cited by examiner

PLUG CONNECTOR PART FOR AN OPTICAL AND/OR ELECTRICAL PLUG CONNECTION

CROSS REFERENCE TO RELATED APPLICATIONS

Applicant claims priority under 35 U.S.C. § 119 of Austrian Application No. A50665/2020 filed Aug. 7, 2020, the disclosure of which is incorporated by reference.

The invention relates to a plug connector part, in particular a cable plug, for an optical and/or electrical plug connection, which has at least a housing and at least a clamping sleeve, which are connected to each other by means of a releasable screw connection, wherein a strain relief arrangement for a cable guided into the plug connector part is arranged inside the housing and/or the clamping sleeve, which strain relief arrangement has a strain relief sleeve, which is supported on an outer sleeve.

Plug connector parts of this type are per se known. Such plug connector parts for an optical plug connection are sold on the market for example under the trademark OpticalCon. They also include an arrangement for strain relief, in which strain relief fibers running through the cable or similar components are connected to parts of the plug connector, which are locked with a socket or a complementary plug connector part and thus relieve the fibers or litz wires of the cable transmitting energy and/or data from possible tensile forces.

To this end, strain relief elements made of a metallic material may be connected to sleeves in the plug connector part, for example by welding, soldering, crimping or similar joining methods. These sleeves are then supported on corresponding structures on the or in the housing of the plug connector part.

However, if strain relief elements made of non-metal materials are to be used, for example in applications in the medical field, these known connection types can no longer be safely applied.

The object of the present invention was to overcome the disadvantages of the prior art and to provide a plug connector part to ensure a safe and fully functional strain relief for the cable connected to the plug connector part even when using non-metal materials.

This object is achieved by means of a device and a method according to the claims.

The device according to the invention is characterized in that the strain relief arrangement has a sleeve opening in a funnel-shaped manner toward the front at least over a part of its length, through which the litz wires, fiber or the like of the cable are guided and fixed therein by means of cured synthetic resin socketing.

The sleeve surrounds the ends of litz wires, fibers or the like of the cable guided into the plug connector part, wherein a fixing connection exists between these elements and the sleeve, preferably in any case also between one strain relief element of the cable and the sleeve.

According to a preferred embodiment of the invention, it is provided that the sleeve is placed at the front side of the strain relief sleeve.

An advantageous embodiment of the plug connector part is characterized in that the interior of at least the funnel-shaped section of the sleeve is filled with the cured synthetic resin.

An embodiment in which the entire interior of the sleeve is filled with the cured synthetic resin is preferred.

According to an optional feature of the invention, the synthetic resin is selected from the group of reaction resins. Epoxy resin is the preferred material.

An embodiment of the invention, according to which the sleeve is supported on the outer sleeve solely via the strain relief sleeve, is preferred.

A possible shield of the cable may be firmly connected to the funnel-shaped section of the sleeve according to a preferred embodiment of the invention. This is preferably achieved by means of crimping.

For the purpose of better understanding of the invention, it will be described in more detail by reference to the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

DESCRIPTION OF FIGURES

Figure 1:
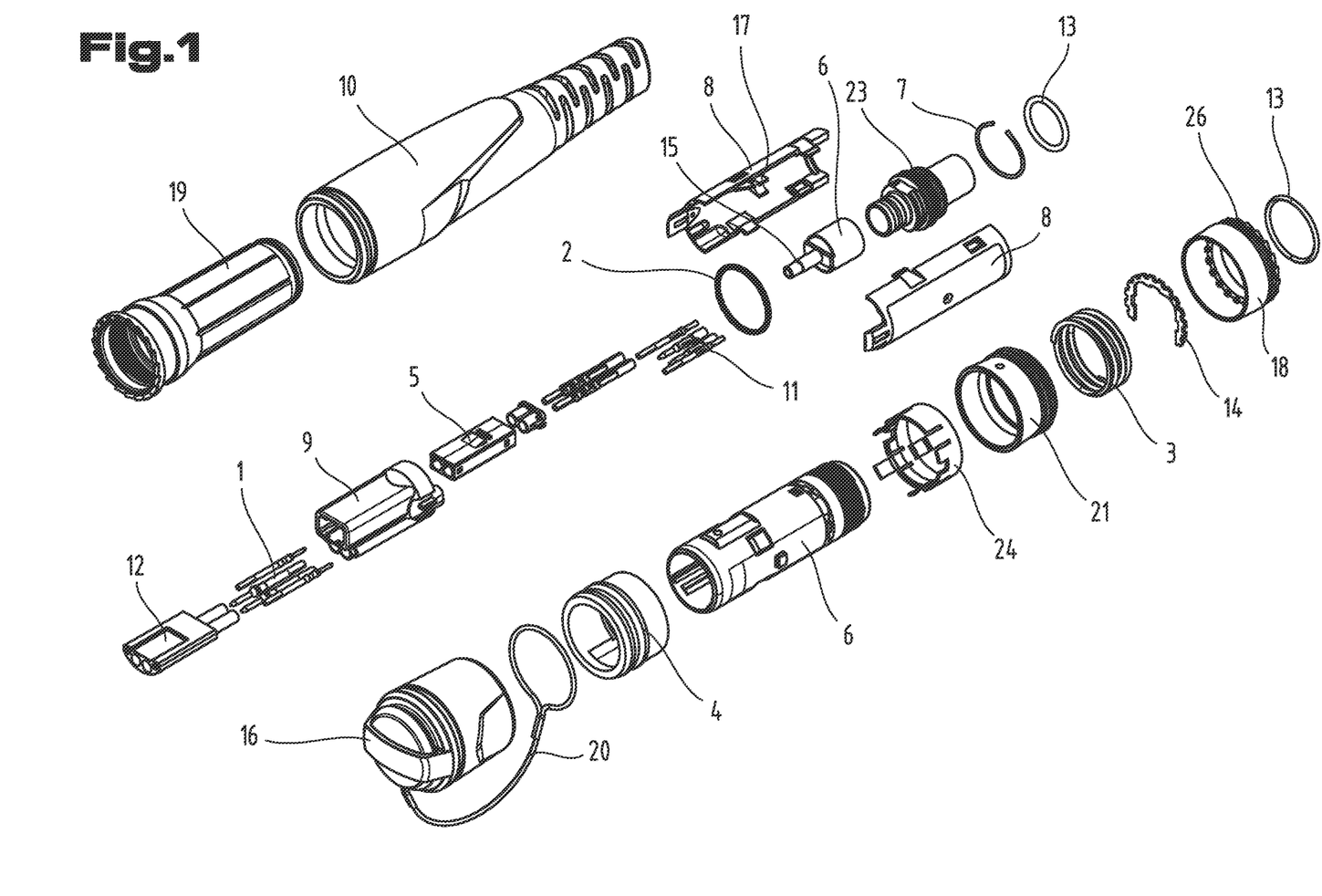
FIG. 1 an exploded view of a plug connector part according to the prior art.

FIG. 1 shows an exploded view of a conventional embodiment of a plug connector part, in particular of a cable plug, for an optical and/or electrical plug connection.

It includes a strain relief arrangement for the cable K (not shown here), which runs through the clamping sleeve 19, preferably also through kink protection 10 pushed onto the clamping sleeve 19, and opens into the housing 6 through the strain relief arrangement 23. The strain relief arrangement further comprises a small, central crimping sleeve 15 and a wider crimping sleeve 6 with a larger circumference. The crimping sleeve 6 is supported by the strain relief sleeve 23 and is connected to the shield of the cable K while the central crimping sleeve 15 is connected to strain relief elements of the cable K.

The strain relief sleeve 23 is supported on the two half shells 8, and these in turn are supported on the clamping sleeve 19. On the inner side of the half shells 8, holding projections 17 are arranged, via which the central crimping sleeve 15 is supported on the half shells 8 and in consequence on the clamping sleeve 19.

Figure 2:
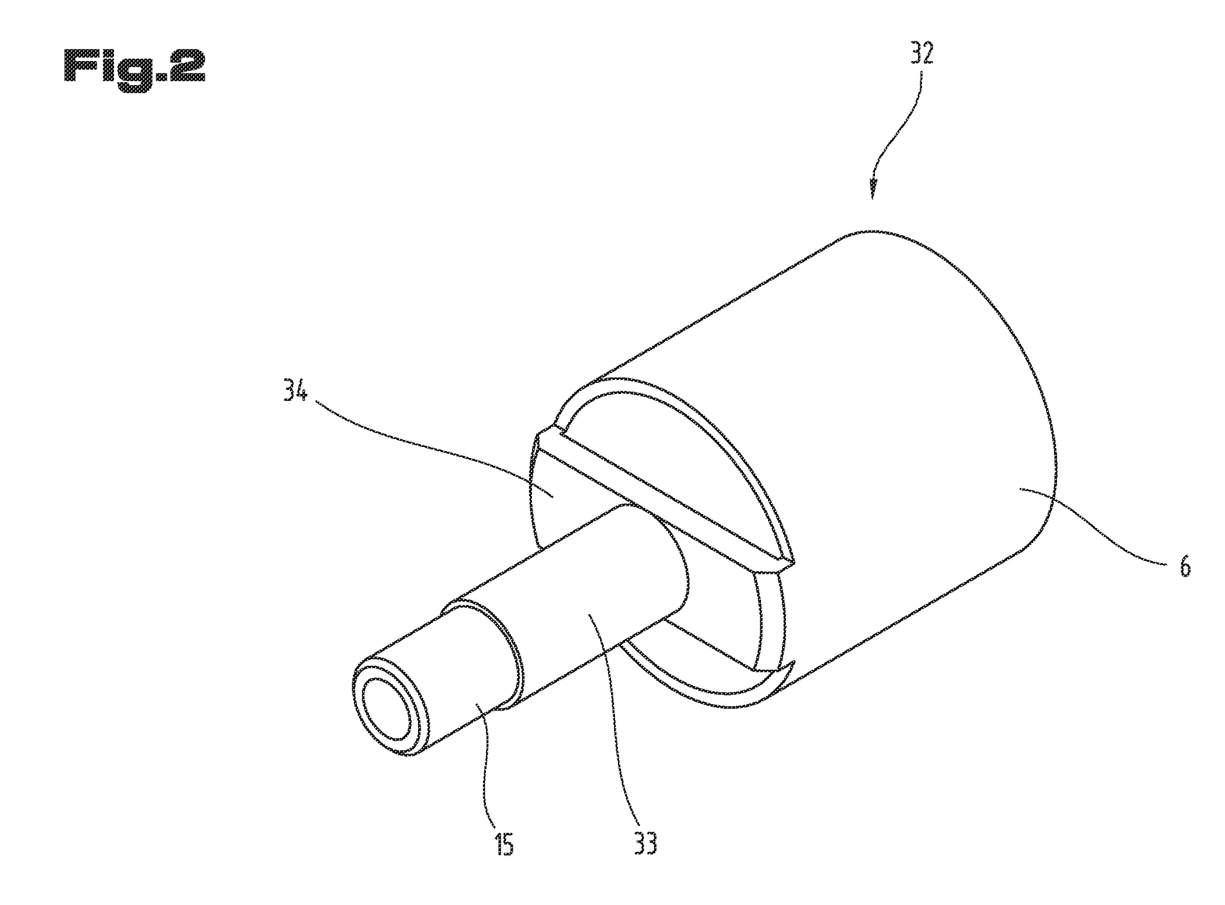
FIG. 2 a different embodiment of sleeves for the strain relief arrangement.

A different embodiment of the prior art as a strain relief arrangement in which the two separate crimping sleeves 15 and 6 are combined into a joint component 32 (see FIG. 2). In this regard, the central, small crimping sleeve 15 is supported via a pipe-shaped intermediate piece 33 and a crossbar 34 on the wider crimping sleeve 6. The component 32 as a whole, in turn, is supported on the half shells 8 and thus in consequence on the clamping sleeve 19, in the manner described already in the context of FIG. 1.

Figure 3:
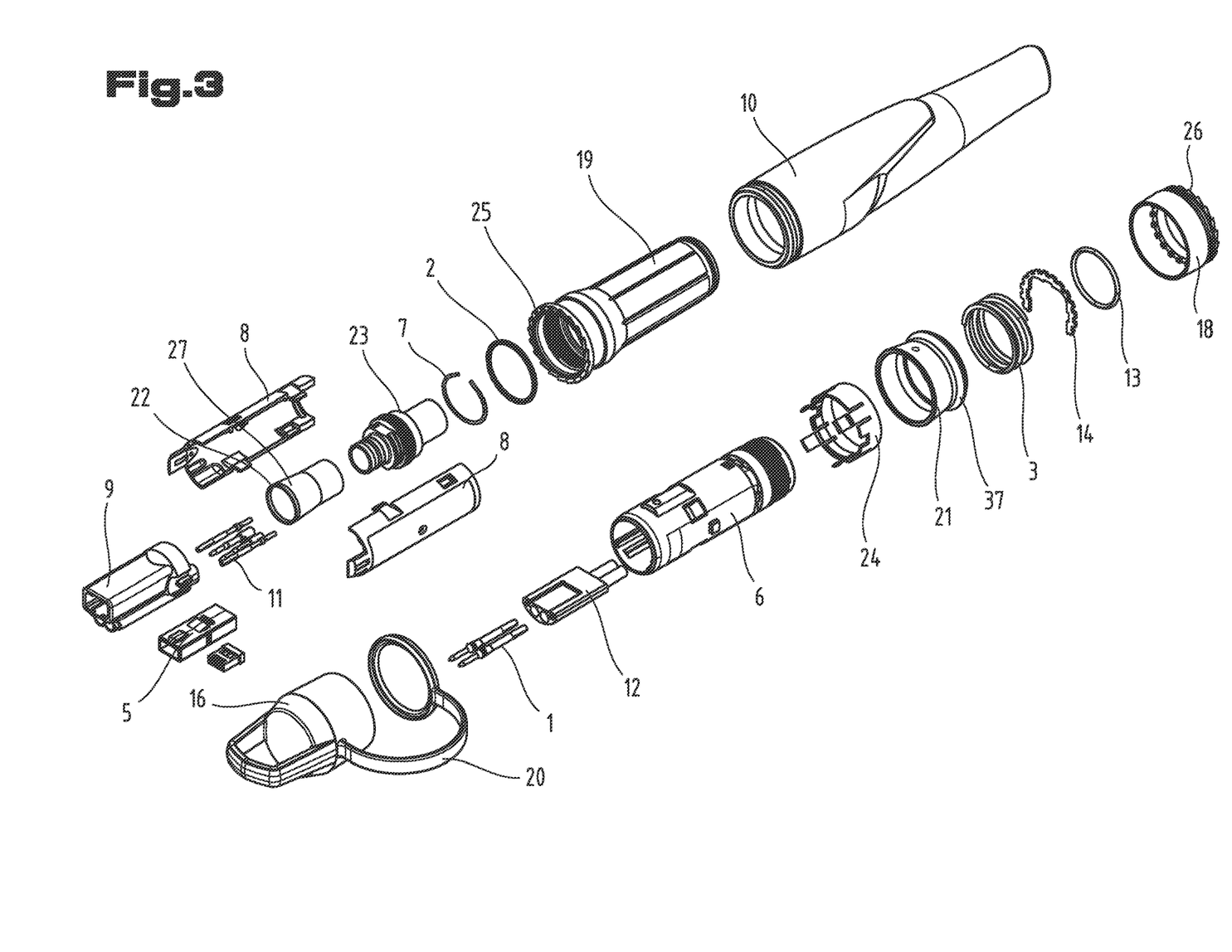
FIG. 3 an exploded view of a plug connector part according to the invention.

FIG. 3 shows a preferred embodiment of a plug connector according to the invention, which is described below in more detail.

The housing 6 of the plug connector according to the invention is connected to a clamping sleeve 19 by means of a releasable screw connection, concurrent with the know embodiment. In this regard, a locking ring 18 movable in the longitudinal direction relative to the housing 6 engages, using a toothing 26, with a fixed toothing 25 of the clamping sleeve 19. This fixed toothing 25 cannot be moved relative to the clamping sleeve 19 and is preferably designed directly thereon and/or formed thereon or first manufactured as an additional part and then accordingly fixed on the clamping sleeve 19.

The locking ring 18 on the housing 6 is impinged by means of a pretensioning spring 3 and is mounted so as to be displaceable in directions parallel to the longitudinal direction of the housing 6. The pretensioning spring 3 pretensions the locking ring 18 in the direction toward an engaging position of its toothing 26 with the toothing 25 of the clamping sleeve 19. Thereby, an inadvertent unscrewing of the screw connection between housing 6 and clamping sleeve 19 is blocked in the engaging position. In order to be able to release the screw connection, the locking ring 18 must be lifted off the fixed toothing 25 of the clamping sleeve 19, against the pretensioning of the pretensioning spring 3, until its toothing 26 and the toothing 25 of the clamping sleeve 19 are then no longer engaged in this release state. When screwing together the housing 6 and the clamping sleeve 19, however, the toothings 25, 26 can slip on each other along their flat tooth flanks, wherein the locking ring 18 is automatically moved against the effect of the pretensioning spring 3.

Of course, however, other connecting methods between the housing 6 and the clamping sleeve 19 could also be provided, for example a bayonet mount or a secured plug connection.

The rotation prevention of the locking ring 18 relative to the housing 6 is effected by a latching ring 14, which can be fastened to the housing 6 so as to rotate with it. In this regard, the locking ring 18 has a series of teeth preferably situated inside, that is in the direction toward the housing 6, with which the complementarily designed outer side of the latching ring 14 engages, and which are preferably formed the locking ring 18 as one piece. The latching ring 14 has a receiving opening open to one side, with which it can be placed onto the housing 6, orthogonally to its longitudinal direction, and be fastened thereon so as not to rotate relative thereto. Despite this rotation prevention, the locking ring 18 is still mounted on the housing 6 so as to be displaceable in the longitudinal direction.

A circumferential groove is located in the gripping surface of the locking ring 18, in which groove a loss protection and/or a fastening element 20 for a cover cap 16 may be suspended. This cover cap 16 is preferably equipped with an insert 4.

The pretensioning spring 3 is clamped between the locking ring 18 and an unlocking ring 21, which is also displaceable on the housing 6 in the longitudinal direction. The unlocking ring 21 is part of a locking and unlocking arrangement, with which the plug connector part according to the invention can be releasable locked after being plugged into a complementary plug connector part, in particular a chassis socket, in order to prevent an inadvertent releasing of the plug connection.

To this end, a puller sleeve 24 is connected to the housing 6 so as not to be displaceable at least axially, which puller sleeve 24 engages with complementary holding structures of the complementary plug connector part, using its lugs facing axially forward, and engages behind said holding structures to form a latching connection. The unlocking ring 21 is above the puller sleeve 24 and presses, when pulled against the effect of the pretensioning spring 3 in the direction toward the locking ring 18, the lugs of the puller sleeve 24 radially inwardly and thus releases the interlocking with the complementary plug connector part.

The edge region 37 of the unlocking ring 21 facing in the unlocking direction is considerably pulled up, starting from a rounded depression extending in the circumferential direction, such that the edge region 37 can be securely gripped even with gloves and pulled backward in order to release the locking with a complementary plug connector part. This is advantageous particularly for the application in the medical field.

A sealing ring 13, also per se known, seals the screw connection between the housing 6 and the clamping sleeve 19 when these two components are screwed together, that is are in a joined state.

In the front section of the housing 6, a contact carrier 12 for adapter contacts 1 is preferably inserted, for example for the electrical transmission of data via some of the litz wires 30 of the cable K. A holding element 9 preferably for the end pieces of optical fibers 29 of the cable K is arranged at the front section of a sleeve assembled from two half shells 8. It preferably simultaneously also acts as a contact carrier for electrical contact elements 11, preferably for energy transmission, which also takes place via corresponding litz wires 30 of the cable K.

The strain relief sleeve 23 is arranged on the rear side, the end of the half shells 8, which is opposite the holding element 9, and is supported on the front end of the clamping sleeve 19 via the half shells 8. A sleeve 22 opening in a funnel-shaped manner toward the housing 6, again, is supported on the strain relief sleeve 23, wherein said funnel-shaped section 27 is formed over at least a part of the length of the sleeve 22 in its front part. Embodiment, in which a cylindrical sleeve is supported on the strain relief sleeve 23 and a completely funnel-shaped sleeve abuts on the cylindrical sleeve as a separate component and is thus supported indirectly on the strain relief sleeve 23, are also possible. The litz wires 30, fibers 29, strain relief elements or the like of the cable K are guided through said sleeve 22 or any other sleeve arrangement of the same type and forward into the housing 6 and are furthermore fixed in at least the cylindrical section of the sleeve 22. Preferably, a possible shield of the cable K, however, is connected to the funnel-shaped section 27 of the sleeve 22, for example by means of crimping. The remaining elements of the cable K are fixed in the sleeve 22 preferably by the interior of at least the funnel-shaped section 27 of the sleeve 22 being filled in with a cured synthetic resin 28. A preferred embodiment provides that the entire interior of the funnel-shaped sleeve 22 and at least also a part of the strain relief sleeve 23 is filled in with the cured synthetic resin 28 (see FIG. 4 and FIG. 5). Thus, using strain relief elements made of non-metal materials is also possible, which is advantageous in medical applications.

The preferred material for filling in the sleeve 22 is epoxy resin, however, other reaction resins such as unsaturated polyester resins, PUR casting resins, amino-plastics or phenolic plastics may also be used. Further embodiments may provide that the synthetic resin socketing extends beyond the sleeve 22 and also fills larger volumes inside the housing 6 and possibly also the clamping sleeve 19.

As all elements 29, 30 of the cable K, including the strain relief elements, are fixed in the sleeve 22 and possibly additionally in the strain relief sleeve 23, the inner sides of the half shells 8 can remain free of holding elements, which naturally makes the assembly significantly easier. The funnel-shaped sleeve 22 is then supported on the outer sleeve made of the two half shells 8 solely via the strain relief sleeve 23.

The strain relief arrangement described above may be arranged entirely on or in the clamping sleeve 19, or may be positioned in the transition area between the housing 6 and the clamping sleeve 19.

A return ring 7 and an annularly shaped spiral spring 2 for EMC shielding are also situated between the strain relief arrangement 8, 22, 23 and the clamping sleeve 19. When screwing together the housing 6 and the clamping sleeve 19, or when joining them in another way, said spiral spring 2 is axially loaded, consequently tilts in the circumferential direction and thereby forms the optimal EMC protection for the gap between the housing 6 and the clamping sleeve 19.

Figure 4:
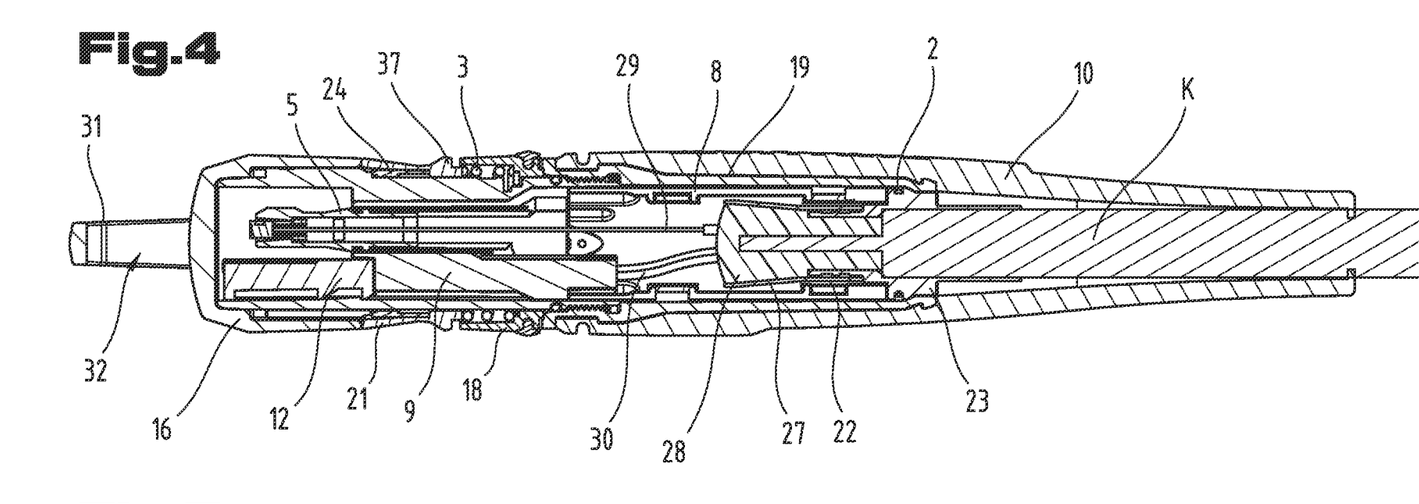
FIG. 4 a longitudinal section through the plug connector part of FIG. 3 with a different cover, FIG. 5 a perspective representation of the inner components of the strain relief arrangement, and FIG. 6 a longitudinal section through a plug connection of the plug connector part according to the invention as a cable plug with a complementary plug connector part in the form of a chassis socket.

FIG. 4 further shows another embodiment of the cover cap 16, which is preferably used in medical applications. A lug 31 sticking out further to the front surrounds the opening 32, through which a user can reach with the finger, also with a gloved finger, to easily and swiftly take off the cover cap 16.

FIG. 5 again shows in an isolated detail how the cable K is guided through a possible kink protection 10 and the clamping sleeve 19 the cable sleeve 19 all the way to the strain relief sleeve 23. Only the individual elements 29, 30 of the cable K are then guided, in a split manner, through this sleeve 23, further to the front, through the sleeve 22 opening in a funnel-shaped manner and into the housing 6. These elements 29, 30 are firmly fixed in the synthetic resin socketing 28 just like a possible shield of the cable K.

Figure 5:
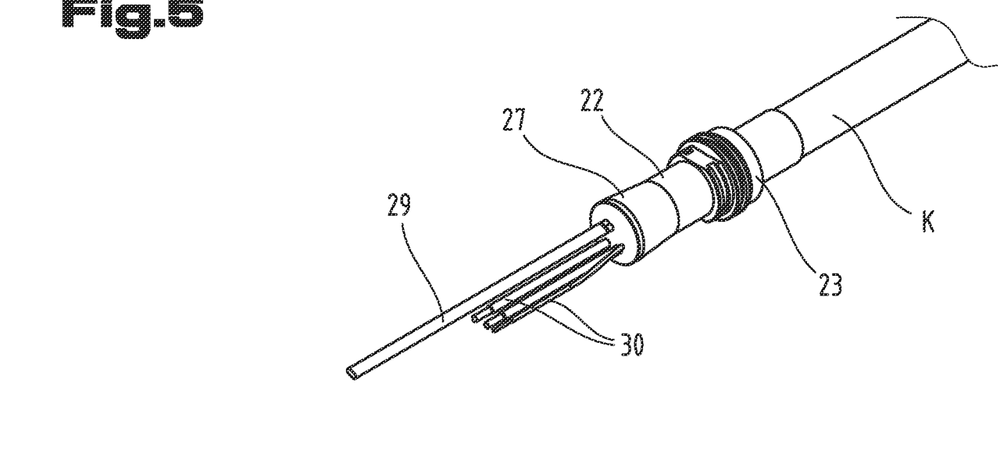

FIG. 5 further shows how the optical guides 29 are guided into the holding element 9 for the ends of the optical fibers 29 and how the electrical conductors 30 are also guided into said holding element 9. Preferably, the contact carrier region of the holding element 9 is extended toward the front by the contact carrier 12. The number of optical fibers and the electrical conductor can principally be any desired number and their maximum number is only limited by the dimensions of the plug connector part.

Figure 6:
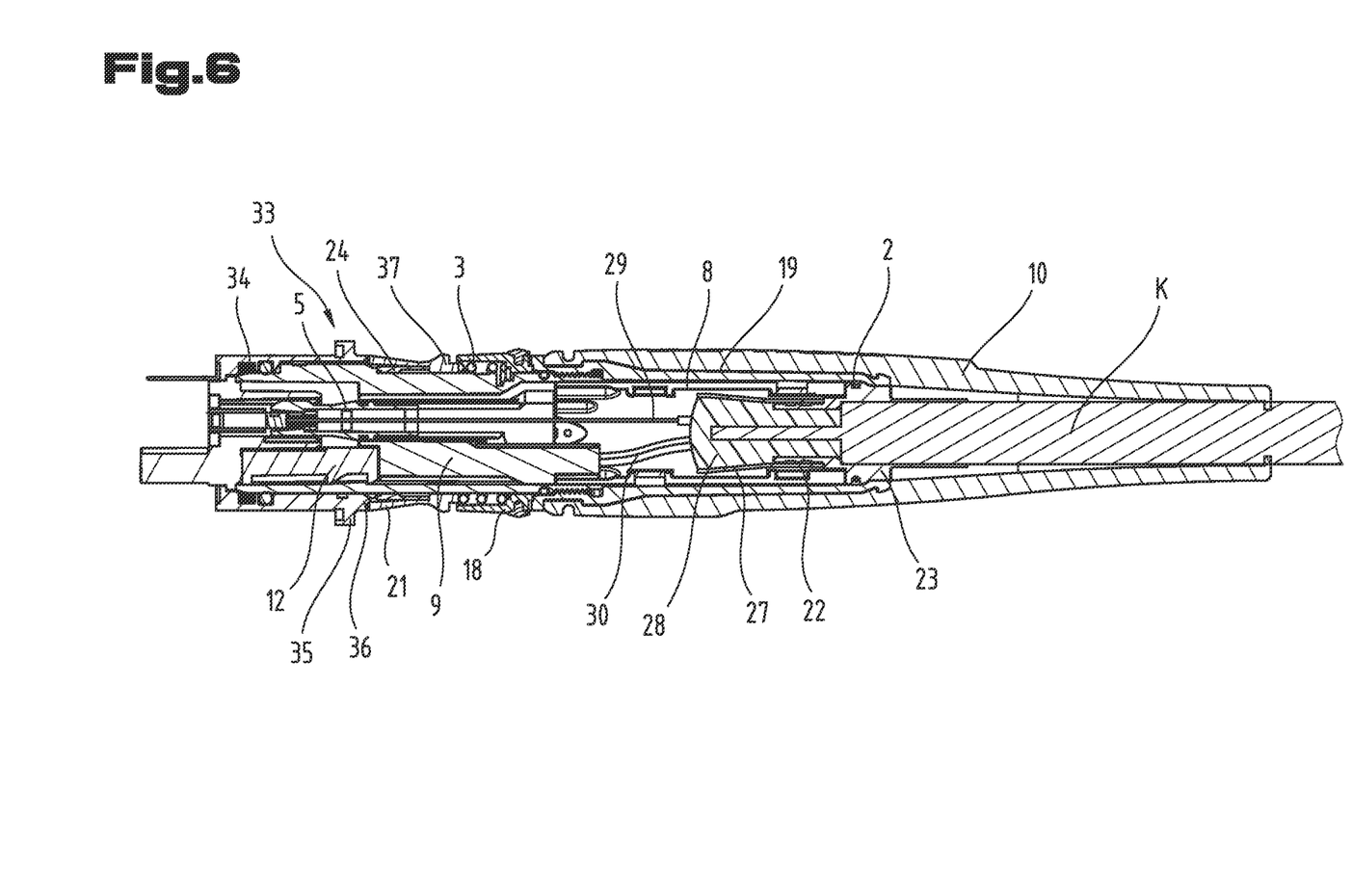

FIG. 6 also shows a longitudinal section, wherein however, the plug connector part according to the invention in the form of a cable plug has been connected to a corresponding plug connector part 33 in the form of a chassis socket to form a plug connection here. The front section of the housing 6 has been pushed into the insertion opening of the plug connector part 33. Its front edge 36 rises only slightly above the plane of the flange plate 35, which is advantageous particularly for devices in the medical field, in order to largely avoid getting caught on said edge 36.

In the complementary plug connector part 33, as well, an annularly shaped spiral spring 34 is inserted, which is axially loaded and consequently tilted by the front end of the inserted housing 6. As a result, optimal EMC shielding is also ensured on the side of the plug connector part 33. Together with the EMC shielding by means of the spiral spring 2 of the other plug connector part at the end of the cable K, this ensures optimal shielding of that region of the plug connection in which the optical and electrical contacting takes place.

In the joined and locked position shown in FIG. 6, the electrical contacts 1 and 11 are connected, in an electrically conducting manner, to corresponding electrical contacts of the plug connector part 33 in the front end of the housing 6. The holding element 9 for preferably the optical fibers 29 directly rests with its contact surface on a contact surface of an optical fiber carrier of the plug connector part 33. This makes the open ends of the optical fibers arranged in the contact surfaces connect in a light-conducting manner, so that optical signal can be transported via this connection.

The exemplary embodiments above show possible embodiment variants, and the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field. Finally, as a matter of form, it should be noted that for ease of understanding of the structure, elements are partially not depicted to scale and/or are enlarged and/or are reduced in size.

LIST OF REFERENCE NUMBERS

1 Adapter contact
2 Annular spring
3 Pretensioning spring
4 Insert for protection cap
5 Contact carrier optical
6 Housing
7 Return ring
8 Half shell
9 Holding element
10 Kink protection
11 Contact
12 Contact carrier electrical
13 Sealing ring
14 Latching ring
15 Crimping sleeve
16 Protection cap
17 Holding projection
18 Locking ring
19 Clamping sleeve
20 Fastening element
21 Unlocking ring
22 Funnel sleeve
23 Strain relief sleeve
24 Puller sleeve
25 Fixed toothing
26 Toothing of the locking ring
27 Funnel-shaped section
28 Synthetic resin socketing
29 Litz wires
30 Optical fiber
31 Lug of protection cap
32 Opening lug
33 Chassis socket
34 Annular spring
35 Flange plate
36 Edge of the insertion opening
37 Edge of the unlocking ring

The invention claimed is:
1. A plug connector part for an optical and/or electrical plug connection, which comprises at least a housing (6) for optical and/or electrical contact elements and their carriers (5, 12) and at least a clamping sleeve (19), which are connected to one another by a releasable screw connection, wherein a strain relief arrangement (8, 22, 23) for a cable (K) guided in the plug connector part is arranged inside the housing (6) and/or the clamping sleeve (19), which strain relief arrangement (8, 22, 23) is configured to relieve litz wires (29), fibers (30), or the like of the cable (K) from tensile forces, the strain relief arrangement comprises:

a strain relief sleeve (23), which is supported on an outer sleeve (8), and a sleeve (22) arranged inside the outer sleeve (8) and opening toward a front in a funnel-shaped manner at least over a part (27) of its length, through which sleeve (22) the litz wires (29), fibers (30), or the like of the cable (K) are guided in a split manner and fixed therein.

2. The plug connector part according to claim 1, wherein the sleeve (22) opening in a funnel-shaped manner is placed on a front side of the strain relief sleeve (23) and supported thereon.

3. The plug connector part according to claim 1, wherein an interior of at least the funnel-shaped section (27) of the sleeve (22) is filled with a cured synthetic resin (28).

4. The plug connector part according to claim 3, wherein an entire interior of the sleeve (22) and at least a part of the strain relief sleeve (23) is filled with a cured synthetic resin (28).

5. The plug connector part according to claim 3, wherein the synthetic resin (28) is selected from a group of reaction resins.

6. The plug connector part according to claim 1, wherein the sleeve (22) is supported on the outer sleeve (8) via the strain relief sleeve (23).

7. The plug connector part according to claim 1, wherein, in addition to the litz wires (29), fibers (30), or the like being fixed within the sleeve (22) opening toward the front in a funnel-shaped manner, a possible shield of the cable (K) is firmly connected to the funnel-shaped section (27) of the sleeve (22).

8. The plug connector part according to claim 1, in an embodiment as a cable plug for optical and/or electrical cables, whose housing is designed for establishing a plug connection to a complementary plug connector part, preferable a chassis socket.

9. A plug connector part, comprising:

a housing (6) for optical and/or electrical contact elements and carriers (5, 12) for said optical and/or electrical contact elements, a clamping sleeve (19), a releasable screw connection between the housing (6) and the clamping sleeve (19), a strain relief arrangement (8, 22, 23) inside the housing (6) and/or the clamping sleeve (19), the strain relief arrangement configured to relieve litz wires (29), fibers (30), or the like of a cable (K) from tensile forces, the strain relief arrangement comprises:

an outer sleeve (8), which forms an outer casing for the strain relief arrangement (8, 22, 23) of the cable (K), and a strain relief sleeve (23), which is supported on said outer sleeve (8), a sleeve (22) arranged inside the outer sleeve (8) and opening toward a front in a funnel-shaped manner at least over a part (27) of its length, wherein the sleeve (22) surrounds ends of the litz wires (29), fibers (30), or the like of the cable (K), and a fixing connection between the litz wires (29), fibers (30), or the like of the cable (K) and the sleeve (22).

10. The plug connector part according to claim 9, further comprising a synthetic resin socketing, which fills a region between the litz wires (29), fibers (30) or the like of the cable (K), as well as the region between these elements and at least the sleeve (22).

11. The plug connector part according to claim 9, wherein the strain relief arrangement (8, 22, 23) is configured to relieve the litz wires (29), fibers (30), or the like of the cable (K) from axial tensile forces.

12. The plug connector part according to claim 1, wherein the strain relief arrangement (8, 22, 23) is configured to relieve the litz wires (29), fibers (30), or the like of the cable (K) from axial tensile forces.

13. A plug connector part for an optical and/or electrical plug connection, the plug connector part comprising:

at least a housing (6) for the optical and/or electrical contact elements and their carriers (5, 12) and at least a clamping sleeve (19), which are connected to one another by a releasable screw connection;

wherein a strain relief arrangement (8, 22, 23) for a cable (K) guided in the plug connector part is arranged inside the housing (6) and/or the clamping sleeve (19), the strain relief arrangement (8, 22, 23) is configured to relieve litz wires (29), fibers (30), or the like of the cable (K) from tensile forces, and the strain relief arrangement comprises:

a strain relief sleeve (23), which is supported on an outer sleeve (8); and a sleeve (22) arranged inside the outer sleeve (8) and opening toward a front with a funnel-shape at least over a part (27) of a length thereof, through which sleeve (22) the litz wires (29), fibers (30), or the like of the cable (K) are guided and fixed therein by a cured synthetic resin socketing.

14. The plug connector part according to claim 13, wherein the synthetic resin socketing fills a region between the litz wires (29), fibers (30), or the like of the cable (K), as well as a region between the litz wires (29), fibers (30), or the like of the cable (K) and at least the sleeve (22).

15. The plug connector part according to claim 13, wherein the strain relief arrangement (8, 22, 23) is configured to relieve the litz wires (29), fibers (30), or the like of the cable (K) from axial tensile forces.

* * * * *